United States Patent [19]

Bergkvist

[11] 4,167,937
[45] Sep. 18, 1979

[54] DEVICE AT HEATING A LIQUID BY SOLAR ENERGY

[76] Inventor: Lars A. Bergkvist, Gottne, 890 42 Mellansel, Sweden

[21] Appl. No.: 848,913

[22] Filed: Nov. 7, 1977

[30] Foreign Application Priority Data

Nov. 19, 1976 [SE] Sweden .............................. 7612978

[51] Int. Cl.² .............................................. F24J 3/02
[52] U.S. Cl. ................................................. 126/440
[58] Field of Search ............................. 126/270, 271

[56] References Cited

U.S. PATENT DOCUMENTS

| | | | |
|---|---|---|---|
| 1,081,098 | 12/1913 | De La Garza | 126/270 |
| 1,704,173 | 3/1929 | Chesney | 126/271 X |
| 4,002,031 | 1/1977 | Bell | 126/271 |

Primary Examiner—John J. Camby
Attorney, Agent, or Firm—Silverman, Cass & Singer, Ltd.

[57] ABSTRACT

A solar heating device for heating a liquid used in the device as the refractive medium. A lens and a heat absorbing member carry the liquid and are connected together so that the liquid may be communicated therebetween. The lens concentrates the solar energy on the heat absorbing member when the lens is full of the liquid, thereby increasing the temperature of the liquid in the heat absorbing member. In a failure condition where the liquid is drained from the heat absorbing member, the liquid also is drained from the lens, decreasing the refraction of the solar energy focused by the lens on the heat absorbing member and thereby decreasing the temperature of the heat absorbing member to avoid a fire.

5 Claims, 5 Drawing Figures

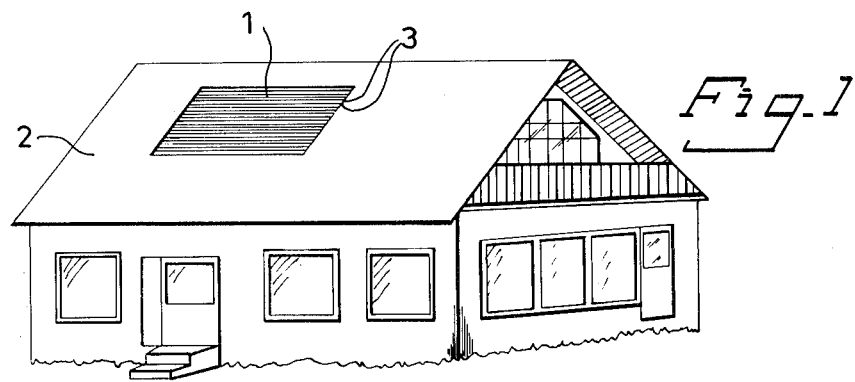
Fig. 1
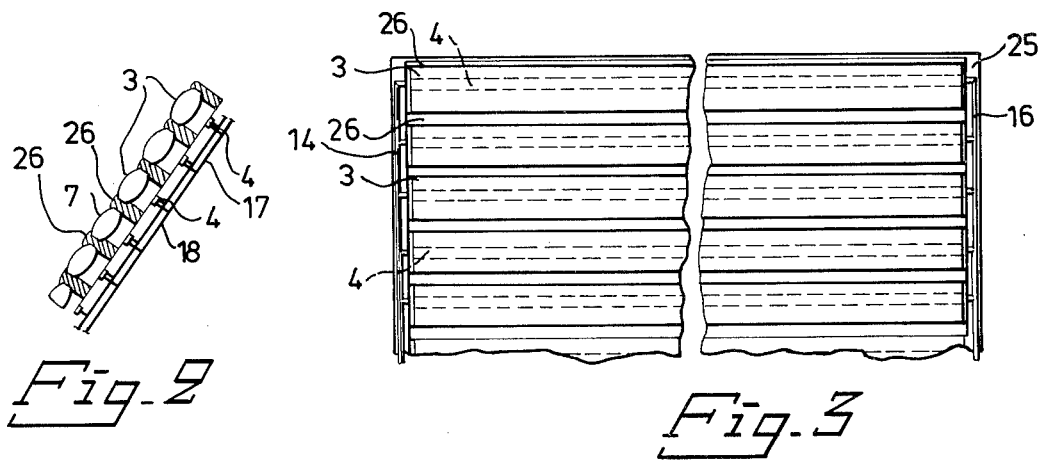
Fig. 2
Fig. 3
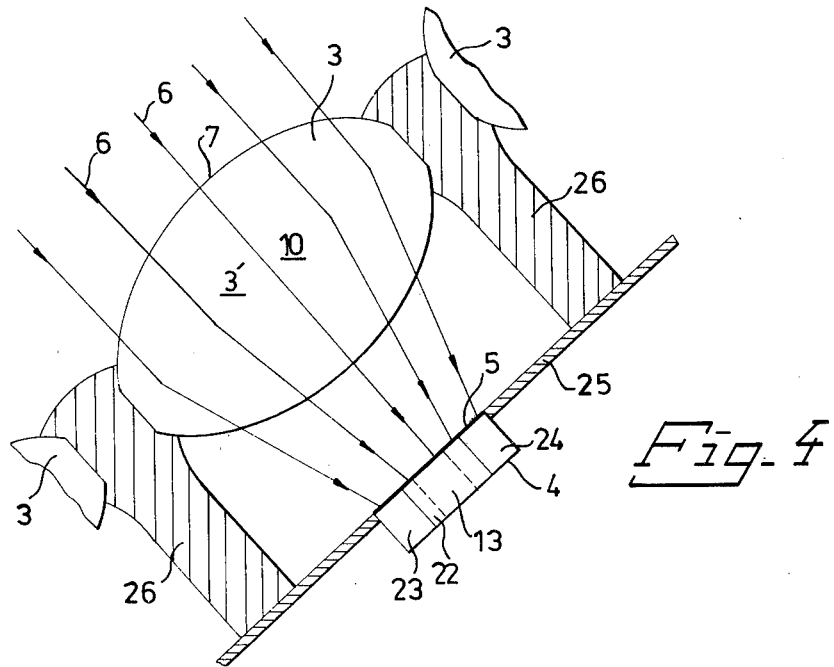
Fig. 4

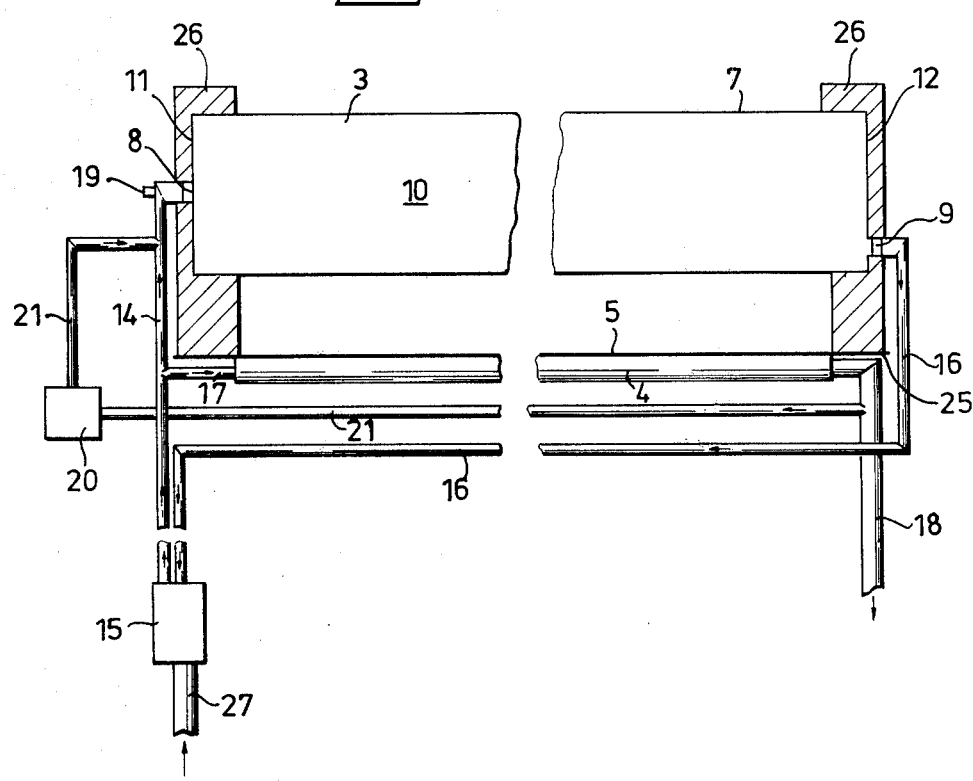

DEVICE AT HEATING A LIQUID BY SOLAR ENERGY

This invention relates to a device for use in heating a liquid, preferably water, by solar energy, in which the liquid is heated by the sunrays lighting a surface with which the liquid is in contact.

Several such devices have been proposed in recent years in connection with the heating of water in single-family houses, where the device, a so-called sun collector, is intended to be positioned on the roof of the house. The heated water normally is intended to be stored in a water tank located in the house.

Such a sun collector mostly comprises a black dull surface, against which the sunrays strike, and piping which contains water, being in metallic, and thereby heat-conductive, contact with said surface.

In places in the North, as for example in Sweden, the radiation intensity of the sun is relatively low during a great part of the year, and it is lowest in wintertime. The period of low radiation intensity coincides with the colder period of the year. Known devices in most cases are designed as described above, but it also is known to concentrate the sun radiation in an optical way, in order thereby to increase the temperature of the heated water. This is a desirable feature because from a consumption point of view it is more suitable to store water of a temperature making possible its use as hot water, i.e. of at least 60° C. During the cold period of the year the sun collector is cooled, and said water temperature is difficult to obtain with the conventional sun collector design.

A great risk, however, is involved in concentrating the light by conventional lenses or mirrors, because the water flowing through the sun collector while the water is simultaneously being heated cools the collector. When this cooling effect ceases due to an interrupted flow of water through the collector, the collector can be damaged because of overheating, which also implies a fire risk for the house.

It is, therefore, desired to concentrate the sunrays and simultaneously to exclude the possibility that the device will be overheated due to disturbed water circulation caused, for example, by a faulty pump.

The present invention relates to a device for concentrating the sunrays and simultaneously being of such a nature as to prevent its overheating due to disturbed water circulation.

The present invention relates to a device for the heating of water by solar energy, comprising one or more heat absorbing members with an upper surface preferably of a metallic material, which members are arranged to be liquid bearing.

The present invention is characterized in that one or more lenses are arranged above the surface of and at a certain distance from said members, and the lenses consist of a shell, in which a light refracting medium constituting said liquid is contained.

The invention is described in greater detail in the following, with reference to the accompanying drawings, in which FIG. 1 shows the outline of a device according to the invention applied to a single-family house, FIG. 2 shows a portion of the device according to FIG. 1, seen from the side, FIG. 3 shows a portion of the device seen from above, FIG. 4 shows a lens and heat absorbing members associated with the device seen by way of a section in parallel with the longitudinal axis of the lens, FIG. 5 shows the device and heat absorbing means seen perpendicularly to the longitudinal axis of the lens.

In FIG. 1 a device 1 according to the invention is shown positioned on the roof of a single-family house 2. In this case and the cases described below the aforementioned liquid is water. When the device 1 for heating water is applied to a house 2, the house is built with a suitable roof angle, thereby giving the device such a normal direction that a maximum of solar energy meets the device. The normal direction of the device, further, is to the south.

In FIGS. 2–5 different sections of an embodiment of a device according to the invention are shown.

The device comprises a plurality of lenses 3 in parallel arrangement relative to each other. See FIGS. 1–3. The device further comprises heat absorbing members 4 provided with a hollow space 13 containing liquid. The heat absorbing members, for example, may be a passageway with rectangular cross-section, in which passageway the liquid, water, is advanced. An upper surface 5, which is plane and located perpendicularly to the optic axis of a lens 3 associated with the member 4 preferably is black and dull. The size of said upper surface 5 is so adjusted that the light passing through the respective lens after its refraction in the lens can be taken up substantially entirely on said surface.

Said members 4 are arranged in parallel with each other and located as described above in relation to a lens 3 associated with a respective member 4.

Each lens 3 has a substantially cylindric shape, with a substantially oval cross-section 3', so that incident light 6 passing through the lens in parallel with the short axis of the oval cross-section of the cylinder, which short axis is the optic axis of the lens, is refracted to a narrow oblong area at a certain distance from the cylinder. The size of said area substantially agrees with the size of the upper surface 5 of the member 4.

Each lens 3 consists of a shell 7 preferably of a transparent plastic. Also other transparent materials, of course, can be used. The outer shell 7 of the lens 3 forms a hollow space in the lens which is water bearing. For this purpose, the lens 3 is provided with an opening 8 for the supply of liquid, and with an opening 9 for the discharge of liquid. The liquid, which here as mentioned is exemplified by water, is designated by 10. The supply opening 8 and discharge opening 9, respectively, preferably are located in the two respective end walls 11, 12 of the lens, which preferably consist of the same material as the lens 3 in general. The light refracting medium in the hollow space formed by the shell 7 of the lens 3, as mentioned above, is said liquid, for example water. This implies that the lens 3 is active as light refracting member only when the lens is filled with water. The lens 3 loses its refracting effect with a small reduction in volume of the water in the lens to such a degree, that the upper surface 5 of the heat absorbing member 4 is met by a smaller amount of light than that passing through to the lens. Consequently, at a reduction in volume of the water in the lens said upper surface 5 assumes a lower temperature than when the volume of water in the lens would be as intended. When the lens does not contain any water, the amount of light meeting said upper surface 5 corresponds to the amount of light for the solar radiation on the surface 5.

By using lenses to refract the light to a smaller surface than the lens surface, an increase in the energy density is obtained, and thereby a higher water temperature in the heat absorbing medium 4 can be obtained. The desired water temperature is obtained by a suitable combination of the configuration of the lens, the size of the upper surface 5 of the heat absorbing member 4, and the water flow through said member. However, a light refraction in order to obtain a higher temperature at said member implies a risk of overheating of said member in the event that the water supply to the member is disturbed or stopped.

In order to protect said member 4 against overheating, and therewith against damages, and to eliminate a possible fire risk involved in overheating for the house 2, one of the two openings of each lens communicates with the water bearing hollow space 13 in the heat absorbing member associated with the respective lens, in such a manner, that when the water supply to the member 4 is stopped or reduced to a predetermined degree, the water amount in the lens decreases and thereby its light refracting effect decreases.

This is rendered possible preferably by a connecting pipe 14 to the supply opening 8 of the lens 3 being connected to a pump 15, which pumps cold water into the system. The discharge pipe 16 from the lens 3 also is connected to said pump 15, to the suction side thereof, so that the cold water discharged from the lens 3 again is pumped into the system. From said supply pipe 14, further, an additional pipe 17 extends, through which water is pumped into the heat absorbing member 4. Said member 4 further is provided with an outlet pipe 18, through which heated water flows to a collecting tank for hot water, radiators etc. Cold water is supplied to the system from a cold water conduit 27, which is connected to the suction side of the pump 15. The arrows in FIG. 5 indicate the flow direction of the water. In the event of an interruption or stop of the water supply from the cold water conduit 27, thus, the water in the lens 3 is pumped partially through the heat absorbing member 4 and transported from the system via its outlet pipe 18, thereby reducing the water volume in the lens. When the pump 15 stops operating, the water in the system by siphon effect is sucked out of the system through the outlet pipe 18. With a reduction of water in the system, the water volume is replaced by air flowing into the system via a valve 19 of a suitable type located, for example, at the supply opening of each lens 3.

During the cold period of the year, and when the liquid in the system is water, a certain heating of the water in the lens 3 may be necessary in order to prevent freezing of said water in the lens. This heating is effected by a part of the heated water flowing in the outlet pipe 18 being directed via an adjustable flow valve 20 and a pipe 21 to the supply pipe 14 for the lens 3. The valve 20 is of a suitable known type and so actuated by the temperature of the outside air, that a suitable temperature of the water to be directed into the lens is obtained.

Said members 4 preferably are provided with several inner walls 22, 23, 24, against which the water is intended to flow in order to give the heat emitting surface in the member 4 a size as great as possible or as desired. Several structural designs are known for achieving this object.

The members 4 are secured in a plate 25 common to the entire device. From said plate 25 extend supporting legs 26 carrying the lenses 3. In the place of co-action with a lens 3, the supporting legs 26 are shaped in agreement with the outer curvature of the lens. The plate 25 preferably can be arranged rotatable with respect to the inclination of its normal direction to the horizontal plane but, of course, also rotatable with respect to the angle of its normal direction to south. This lastmentioned rotation possibility, however, is of less importance because the cylindric oblong lenses render a ray concentration with relatively small variation in size when the light strikes at an angle slightly exceeding or being below 90° to the longitudinal axis of the cylinder, provided that the light is in parallel with the optic plane of the lens. The configuration of the lens 3, thus, implies a great advantage for the energy exchange between incident energy in the form of radiation and radiation energy obtained meeting said members when the device is mounted stationary with the lenses lying in a horizontal plane.

The invention, of course, also can be applied to round convex lenses or lenses of another configuration, or systems of lenses.

Light-refracting media other than water can be used, for example a water-glycol mixture or a water-alcohol mixture, in which case the member 5, the conduits 16, 14, 21, the pump 15 and the lens 3 form a closed system. The conduit 27 is used only for filling the system, and the conduit is used only for draining the system. An expansion vessel preferably is provided in connection to the valve 19.

At this latter embodiment, the members 5 are designed as a heat exchanger, at which one system contains the circulating liquid 10 and one system contains, for example, water. Heat energy is transferred from the liquid 10 to a medium, for example water, which is to be heated and thereafter transported to a container for storing said medium, radiators etc. The heat exchanger can be of a suitable known type.

The lenses 3 and members 4, respetively, as mentioned above, are located in parallel relationship to each other. The members may be connected in parallel relative to each other, as indicated in FIG. 2, but they also may be connected in series. It is, however, preferable to have a mutual parallel connection of the members 4. Each of the lenses should be connected to the respective member as described above, but also may be connected in another suitable way.

The invention is not to be regarded as restricted to the embodiments described above, but can be varied within its scope defined in the attached claims.

I claim:
1. A device for heating a liquid such as water or the like by solar energy comprising,
    at least one metal heating absorbing member having an upper surface and a space for bearing the liquid,
    at least one lens located above said upper surface, the lens having a space for bearing the liquid with the space for bearing the liquid in the lens communicating with the space for bearing the liquid in the heat absorbing member so that a decrease of the amount of liquid in the heat absorbing member decreases the amount of liquid in the lens associated therewith whereby the light refraction of the lens is reduced.
2. A device as claimed in claim 1 in which there are more than one heat absorbing members and each heat absorbing member communicates only with the lens which is located next thereabove.

3. A device as claimed in claim 1 wherein each lens further comprises a shall made of a transparent plastic.

4. A device as claimed in claim 1 wherein each lens further comprises an elongate substantially cylindrical form the cross section of which has a substantially oval shape such that parallel light which passes through the lens parallel to the small axis of the oval cross section of the cylinder, which constitutes the optical axis of the lens, is refracted to a narrow elongate area at a certain distance from said cylinder.

5. A device as claimed in claim 1 wherein a plurality of lenses are arranged in parallel with each other, a plurality of heat absorbing members are arranged in parallel with each other and the upper surface of each heat absorbing member is located perpendicular to the optic axis of the lens associated with the heat absorbing member.

* * * * *